March 26, 1946.  H. D. HILL  2,397,110
LATHE APPARATUS FOR CUTTING COMB GRAIN VENEER
Original Filed Jan. 31, 1941  4 Sheets-Sheet 1
FIG. 1-A 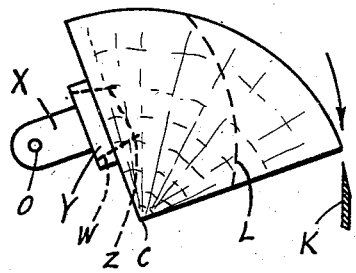  FIG. 1-B 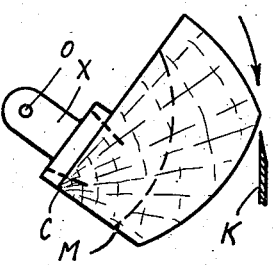  FIG. 1-C 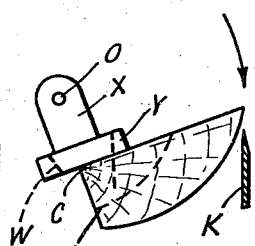
FIG. 2-A 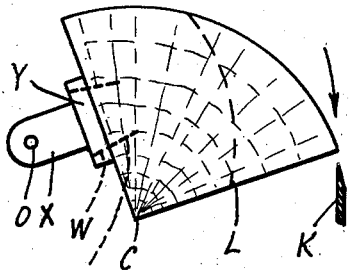  FIG. 2-B 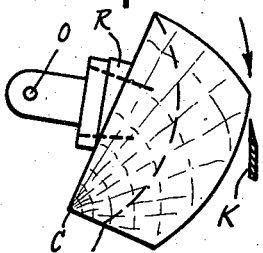  FIG. 2-C 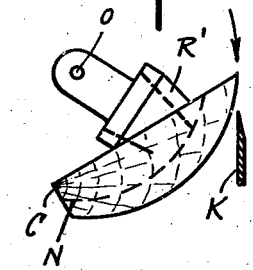
FIG. 3-A 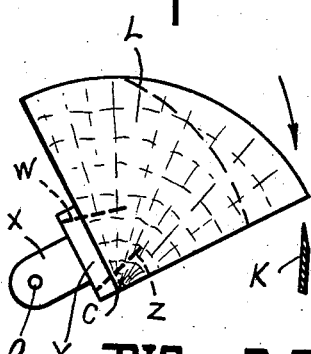  FIG. 3-B 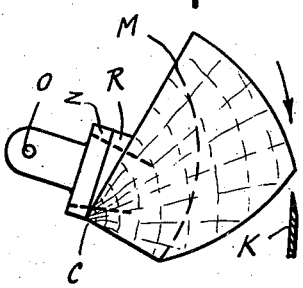  FIG. 3-C 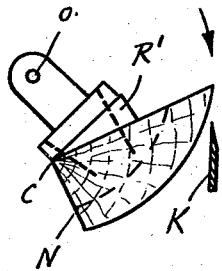
FIG. 8-C 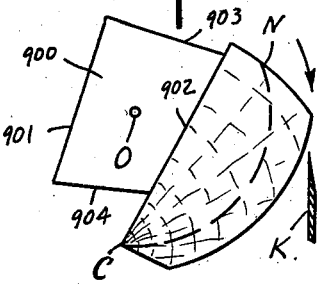  FIG. 8-D 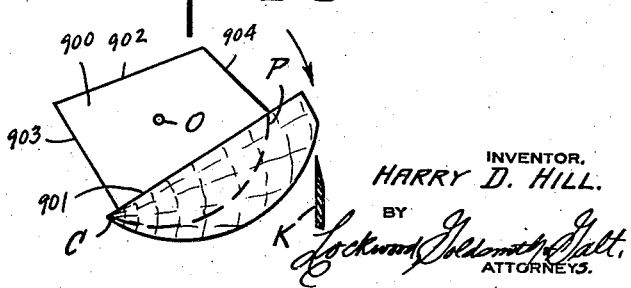
INVENTOR.
HARRY D. HILL.
BY
Lockwood Goldsmith Galt,
ATTORNEYS.

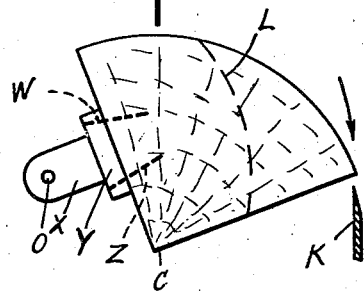
FIG. 4-A
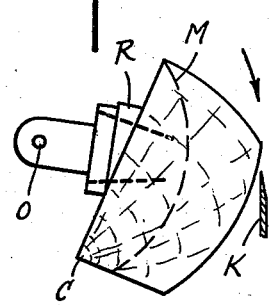
FIG. 4-B
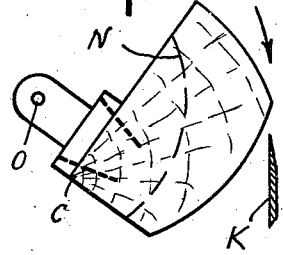
FIG. 4-C
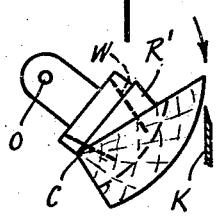
FIG. 4-D
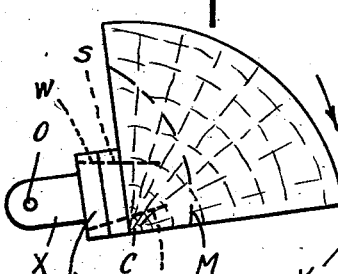
FIG. 5
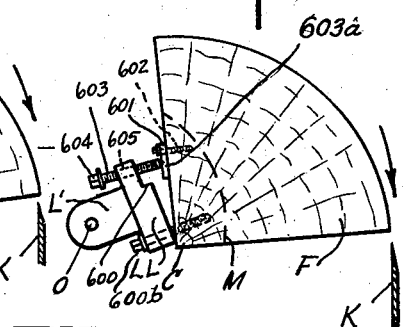
FIG. 6
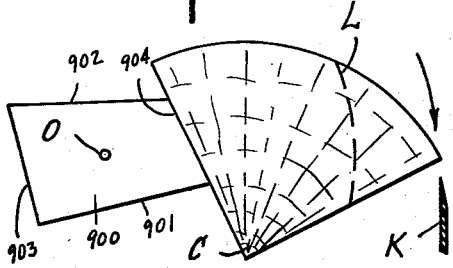
FIG. 8-A
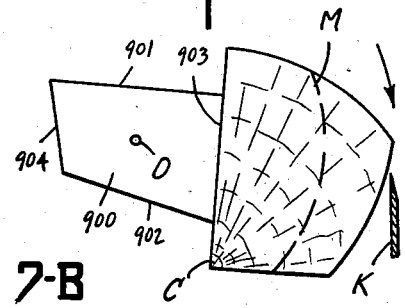
FIG. 8-B
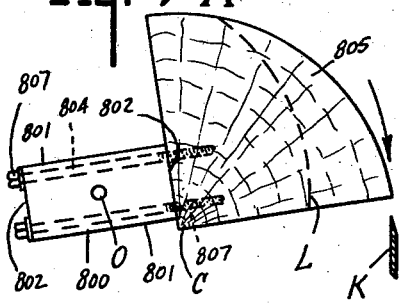
FIG. 7-A
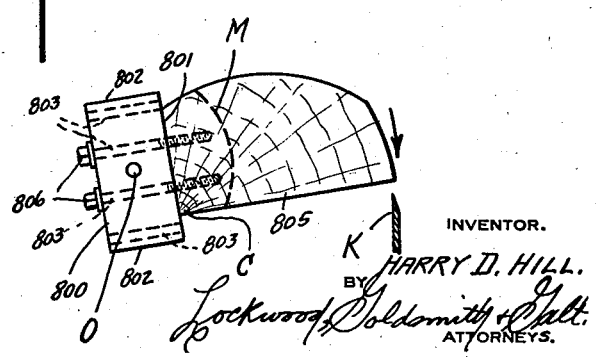
FIG. 7-B March 26, 1946. H. D. HILL 2,397,110
LATHE APPARATUS FOR CUTTING COMB GRAIN VENEER
Original Filed Jan. 31, 1941 4 Sheets-Sheet 3

INVENTOR
HARRY D. HILL
BY
ATTORNEYS

March 26, 1946.       H. D. HILL       2,397,110
LATHE APPARATUS FOR CUTTING COMB GRAIN VENEER
Original Filed Jan. 31, 1941       4 Sheets-Sheet 4
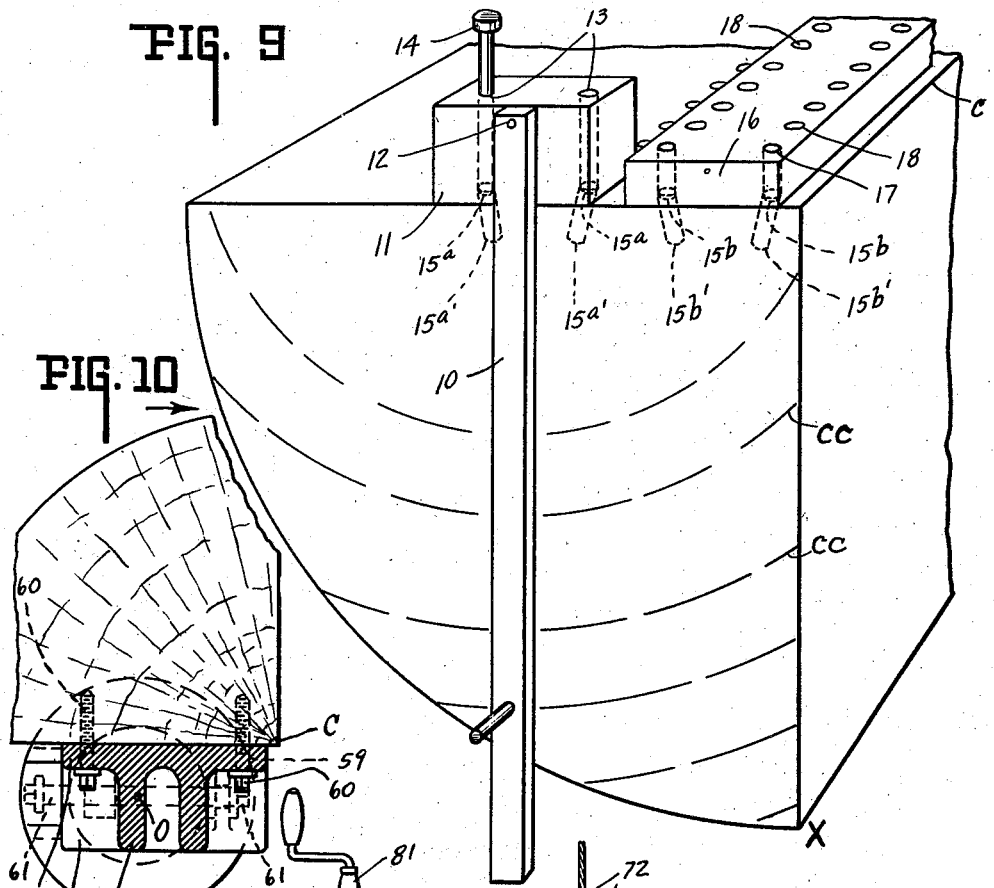
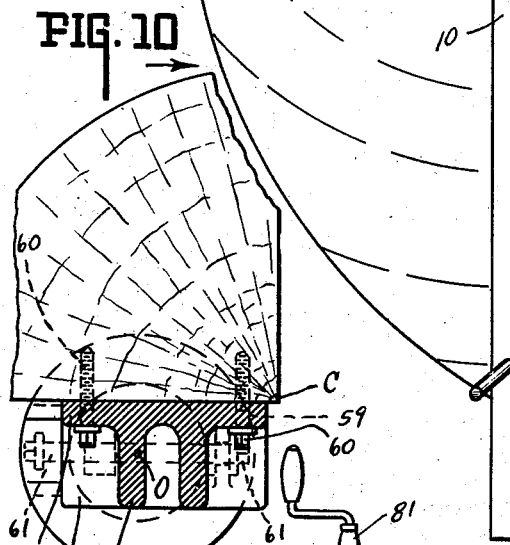
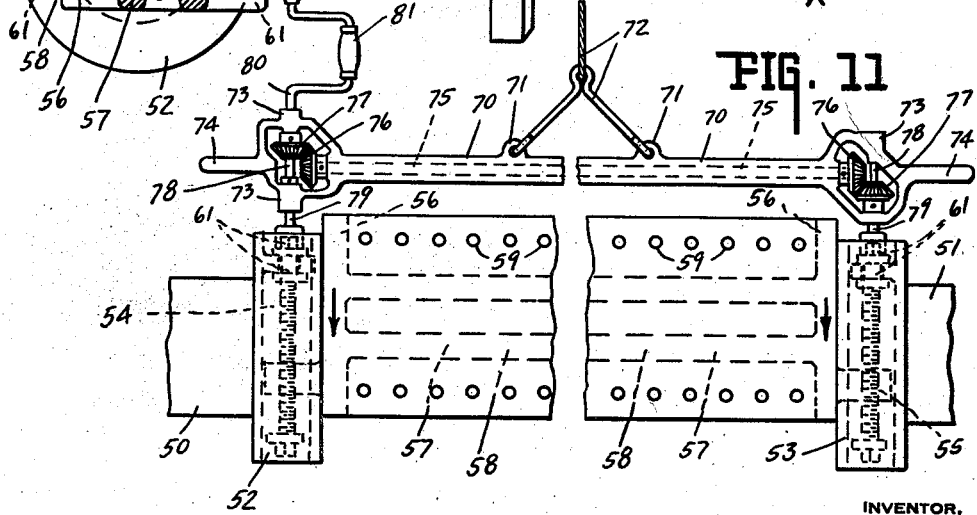
INVENTOR.
HARRY D. HILL.
BY
Lockwood, Goldsmith & Galt
ATTORNEYS.

Patented Mar. 26, 1946

2,397,110

UNITED STATES PATENT OFFICE

2,397,110

LATHE APPARATUS FOR CUTTING COMB GRAIN VENEER

Harry D. Hill, Franklin, Ind., assignor of fifty per cent to Amos-Thompson Corporation, Edinburg, Ind., a corporation, and fifty per cent to Hill Bros., Edinburg, Ind., a partnership Original application January 31, 1941, Serial No. 376,722. Divided and this application October 31, 1941, Serial No. 417,240

8 Claims. (Cl. 144—214)

This invention relates to apparatus for producing what is called needle-point or comb grain veneer, using a cutting knife as distinguished from a slicing or sawing arrangement.

This application is a division of the copending application, Serial No. 376,722, filed January 31, 1941, entitled, "Lathe process and apparatus for forming comb grain veneer," and now Patent No. 2,261,497, dated November 4, 1941, and entitled, "Method of processing comb grain veneer."

In view of the extended explanation set forth in the aforesaid patent and specifically made a part hereof, the same is intentionally omitted from the instant application, with the observation that the process as illustrated, described and claimed in the aforesaid patent, produces better comb grain veneer, produces the same more economically and from each unit quantity of veneer stock there can be obtained more veneer therefrom than has heretofore been possible by other methods.

The chief object of the present invention is to provide apparatus or means for transforming a conventional veneer lathe, particularly of the stay log type, to a structure for utilization of the same through the medium of other instrumentalities so that the method defined by the aforesaid patent may be so accomplished.

The full nature of the invention will be understood from the accompanying drawings and the following description and claims:

In the drawings,

Fig. 1A is a diagrammatic side elevation of a stay log and quarter log flitch with veneer knife adjacent thereto, the flitch being approximately medianly mounted on the stay log.

Fig. 1B is a similar view with the flitch mounted on the stay log so that the cutting face is substantially coincident with the knife approaching side edge of the stay log.

Fig. 1C is a similar view with the reduced flitch similarly shifted as before to permit further reduction of the flitch and veneer formation therefrom, but in this instance the flitch is secured to the stay log by a single row of screw bolts.

Figure 6A:
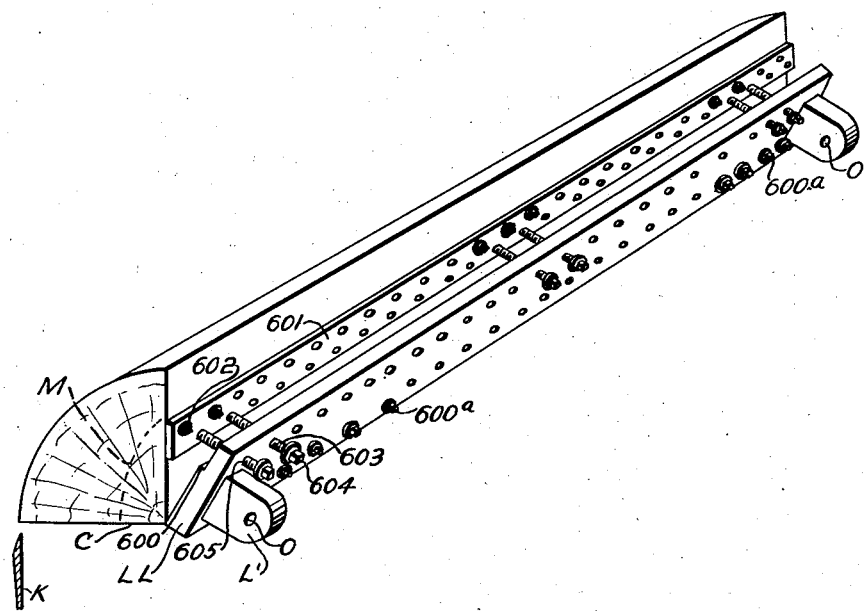

Figs. 1A to 1C, inclusive, are diagrammatic representations of the shifting of the flitch on the stay log and parallel to the flitch anchoring face thereof.

Fig. 2A is a view similar to Fig. 1A.

Fig. 2B is a view similar to Fig. 2A but with the reduced flitch tilted on the stay log by means of a wedge arrangement.

Fig. 2C is a similar view of the reduced flitch tilted to a greater degree by the inclusion of a thicker wedge.

Figs. 2A to 2C, inclusive, are diagrammatic representations of the tilting of the flitch upon a stay log, the flitch being medianly secured, as it were, to the stay log.

Fig. 3A is a diagrammatic view of a similar log flitch secured to a stay log with the knife approaching face of the stay log in substantial registration with the initial cutting face of the flitch.

Fig. 3B is a similar view of the reduced flitch tilted upon the stay log by means of a wedge.

Fig. 3C is a similar view of the still further reduced flitch tilted to a greater degree by means of a still thicker wedge.

Figs. 3A to 3C, inclusive, differ from Figs. 2A to 2C, inclusive, in that the flitch is initially positioned on the stay log in a different position, tilting by wedging being disregarded in this comparison.

Fig. 4A is a view similar to Fig. 1A.

Fig. 4B is a view similar to Fig. 2B.

Fig. 4C is a view somewhat similar to Fig. 1B.

Fig. 4D is a view similar to Fig. 3C.

Figs. 4A to 4D, inclusive, are diagrammatic views of flitch mounting including progressive shifting and tilting, the latter being by wedging.

Fig. 5 is a diagrammatic representation of a flitch mounted on a stay log in juxtaposition to a veneer knife and with an included spacing member between the stay log and the flitch to leave a smaller core.

Fig. 6 is a diagrammatic view of a representation of a flitch, a veneer cutting knife and a stay log supporting the flitch, the flitch being secured to the stay log by means of an adjustable screw arrangement whereby the flitch may be progressively tilted on the stay log.

Fig. 6A is a perspective view of the stay log, etc., structure illustrated in Fig. 6.

Fig. 7A is a diagrammatic view of a flitch mounted on a modified form of stay log.

Fig. 7B is a similar view of the same stay log with the reduced flitch, otherwise mounted on said stay log.

Fig. 8A is a diagrammatic view of a still further modified form of stay log with the flitch mounted thereon.

Fig. 8B is a similar view of the flitch shown in Fig. 8A when reduced and mounted upon the opposite side of the stay log shown in Fig. 8A.

Fig. 8C is a similar view with the flitch shown in Fig. 8B further reduced and mounted on an intermediate side of the stay log.

Fig. 8D is a similar view of the smallest flitch reduction mounted on the other intermediate side of the stay log.

Figs. 7A—7B are representative of a shifting of the flitch to different sides of the stay log to obtain shifting of the flitch on the stay log relative to the axis of rotation of the stay log.

Figs. 8A to 8D, inclusive, are of similar character.

Fig. 9 is a diagrammatic section of a quarter log flitch with a scribing gauge, chalk and punch for marking purposes, and a pattern board for bolt position marking to be applied to the flitch.

Fig. 10 is a transverse sectional view through a modified form of stay log mounting with a quarter log flitch thereon illustrative of another method of forming comb veneer. The flitch is ready for initial cutting and the stay log proper thereafter is brought toward the axis of rotation as the flitch is reduced.

Fig. 11 is a side elevational view of the adjustable stay log arrangement shown in Fig. 10.

A conventional, stay log type, of veneer lathe is one wherein the bed provides spaced apart, aligned bearings and therein is mounted the trunnion portions of the stay log structure which may take many forms. Power applied to either or both trunnion portions rotates the stay log about the trunnion axis and at a controlled speed. This speed upon initial rotation for observation purposes only is very slow compared to normal running speed.

Parallel to the trunnion axis is slidably mountted a knife carriage. This carriage adjustably mounts a knife having a cutting edge parallel to the trunnion axis. The carriage may be moved quickly toward and away from the trunnion axis for initial positioning and after cutting has ceased, respectively. After initial positioning, the knife carriage is automatically moved toward the trunnion axis a predetermined amount or distance for each rotation of the stay log, determinable by the thickness of the veneer sheet desired.

Log flitches are first bolted to the stay log, the knife carriage brought up to initial cutting position and the stay log slowly rotated. Then the automatic knife carriage feed is utilized and the knife is advanced toward the trunnion axis, the required distance during the interval following the recession of the trailing edge of the flitch from the knife to the presentation of the leading or advancing edge of the flitch to the knife edge.

Inherent in such a conventional veneer stay log type of lathe knife cutting is limited to a maximum of 180° of stay log rotation, and knife advance takes place during about 90° of the remaining rotation, usually occurring intermediate the 180° of non-cutting rotation. Many conventional veneer lathes of this character have the stay log removably mounted and in the bearings there may be detachably mounted rotatable axially aligned gripping plates similarly rotatable. Lathes so equipped also have their carriage feed mechanism arranged to continuously and progressively advance the knife edge toward the plate center so that continuous sheet cutting is effected, et cetera, all in a manner well known in the industry at this time.

Except for the specific stay log disclosures, more particularly hereinafter described and illustrated, the lathe of the present invention is of the aforesaid general character. Except for the specific stay log disclosures therein, the patents to Kessler No. 1,574,037, dated February 23, 1926, and Stone No. 1,786,460, dated December 30, 1930, are representative disclosures of such generally conventional lathes.

It is to be understood that stay logs usually, and in the present invention as well, include a flitch supporting main body portion terminating at opposite ends in crank-like cheeks or plates from each of which projects a trunnion, the trunnions being coaxial and oppositely directed.

By way of example, see Figs. 10 and 11, the stay log structure includes oppositely directed, axially aligned spaced trunnions 50 and 51 supporting plates 52 and 53, respectively, in turn supporting opposite ends of the main body portion or flitch supporting portion of the stay log. Such body portion is provided adjacent each side edge of the flitch supporting face with a spaced series of tapped holes for receiving flitch anchoring bolts extending into the flitch on that supporting portion. This general description applies to substantially all conventional stay logs.

Since the stay log type of veneer lathes is so well known and broadly illustrated and described in said patents and similarly described herein, and since the present invention is directed to the stay log structure per se and associated mechanism other than the lathe proper, no further description or illustration of such lathe is believed desirable or necessary, and the following description and the illustrations accordingly will be confined to the stay log per se and its associated mechanisms, other than the lathe proper.

In all of Figs. 1 to 5, inclusive, the conventional stay log is diagrammatically illustrated and therein O indicates one trunnion, X the associated crank or cheek portion, Y the flitch supporting main body portion, Z the anchoring bolts and W the bolt receiving openings through the stay log main body portion.

In these figures O corresponds to 50—51 in Figs. 10 and 11, X corresponds to 52—53 therein, Y corresponds to 53 and W corresponds to 59.

Figs. 1A to 1C inclusive, illustrate the simplest method of utilizing a conventional stay log structure to practice the invention set forth in the Hill patent, No. 2,261,497, before mentioned. In Fig. 1A the lathe knife K is progressively advanced during each rotation of the stay log until it has reduced the stay log supported flitch to the size indicated by dotted line L.

The knife is then rapidly "backed off." The reduced flitch is removed from the stay log and repositioned as shown in Figs. 1B and the knife quickly "advanced" to the position shown in said Fig. 1B. Cutting is resumed until the flitch is reduced to the size indicated by dotted line M in Fig. 1B. The foregoing procedure is repeated, see Fig. 1C, until the flitch is reduced to the size indicated by dotted line N, the resultant or remainder being the "core."

In Figs. 2A to 2C, inclusive, the flitch position relative to the stay log is adjusted by interposing a wedge means R or R' between the flitch and supporting face of the stay log, wedge R having a lesser included angle than wedge R'.

Figs. 1A to 1C, inclusive, show shifting of the flitch parallel to the stay log supporting face whereas Figs. 2A to 2C show shifting of the flitch by tilting same relative to the stay log supporting face. Figs. 3A to 3C, inclusive, show shifting similar to Figs. 2A to 2C, inclusive, but instead of mounting the flitch so that opposite sides thereof overhang or project beyond opposite side edges of the stay log, the flitch in Figs. 3A to 3C, inclusive, overhangs but one side edge of the stay log.

Figs. 4A to 4D, inclusive, show flitch shifting by sliding and wedging. In the latter figures the flitch is shown shifted thrice instead of twice as in each of the other figure groups.

Reference will now be had to Fig. 5. Herein the initial cut reduces the flitch to a size indicated by line M. The flitch is spaced from the supporting face of the stay log by spacer S. Inclusion or removal of such a spacer obviously results in a shift of flitch position relative to the axis of rotation or trunnion axis.

Reference now will be had to Fig. 9 more particularly. The cleaned and properly heated quarter log flitch illustrated is suitably supported and then a master gauge is applied to the sawed end of the flitch as shown in Fig. 9, if desired, or necessary. Chalk marks CC are placed on that end by swinging the arm 10 and comparing the same with the flitch radiating rays, as shown in Fig. 9.

The base 11 of the gauge pivotally supports the arm 10 at 12 and this base is shifted to and fro until by trial and observation the proper position is obtained. The base 11 has holes 13 therethrough spaced apart the exact distance that the stay log bolt receiving holes are spaced apart on the flitch mounting face of the stay log. The distance that the pivot 12 is from the face upon which the block 11 bears is the distance that the flitch mounting face of the stay log is off center from the axis of rotation of the stay log and this is necessary to determine the exact position that the flitch should be secured to the stay log in order to determine the correct radius to obtain comb grain veneer when starting the cutting process upon the flitch when mounted on the stay log.

A punch 14 marks these hole locations at 15a. Then the gauge is moved toward the heart center edge of the flitch and additional marks 15b are formed in the flitch. These latter marks are so placed that the stay log anchoring screws always will enter the flitch and hold the same to the stay log.

Then a master board 16 is twice applied to the punch marked face of the flitch and holes 17 of the board are registered with holes 15a and then with holes 15b, the board being spaced from the log center edge at the opposite end of the flitch the exact distance it is spaced from the log center edge of the flitch at the arc scribed end or face thereof.

The board may have two series of holes 18, each aligned with a hole 17. The punch 14 marks the flitch through all of one series and therein that closest to the unmarked face of the flitch and, in most cases, only the two end holes closest to the ends of the flitch, it being found unnecessary, usually, to use more than two end screws of the other available series and these are to prevent chattering, et cetera. Following hole marking, holes usually are drilled into the flitch to the proper depth and preferably with a power drill to expedite production.

When the preceding flitch has been completely cut, the core thereof is removed from the stay log by backing out the anchoring screws. The knife is moved away from the stay log rotation axis and to a position where it will not cut the new flitch, if accidentally rotated past the same.

Then the marked and hole drilled flitch is presented to the anchoring face of the stay log and is positioned so that its anchoring face is opposite the knife relative to the axis of stay log rotation. The usual hoist, cable and grips present the flitch to the face of the stay log and hold the flitch until the screws are reapplied to the stay log which is when the flitch drilled holes 15a' and 15a' register with the stay log holes. The bolts in the two end holes are usually applied after the flitch has been rotated 90°. A power tool, preferably, is used for screw application and removal to facilitate flitch mounting and removal.

After mounting and securing the flitch to the stay log so same will not chatter in cutting, the flitch is slowly rotated and the knife brought back into cutting position and cutting started at slow speed. When the veneer sheet so cut is of commercial width and length (because the tree may not have been of uniform diameter) normal cutting speed is utilized.

Cutting then is continued until figure begins to appear in the veneer. When that occurs the rotation is stopped, the hoist, cable and grips are reapplied to the flitch ends and then the screws are removed. The flitch then is shifted on the face of the stay log and similarly reanchored thereto as at 15b'. Cutting is resumed until only the core is left on the stay log. When this occurs, it is removed and a new flitch is applied, said new flitch having been prepared as previously described while the preceding flitch was being cut.

If two positionings of the flitch upon the stay log as represented by Figs. 1A and 1B are insufficient to reduce the flitch to core size, the same procedure previously set forth is repeated and the flitch is shifted from the position shown in Fig. 1B to the position shown in Fig. 1C and since the flitch is of considerably less weight and volume, a single row of bolts, as shown by the dotted lines in Fig. 1C, is sufficient to anchor this reduced flitch to the stay log. The reason chattering does not occur with this reduced flitch is because a stiff and rigid support is provided for the reduced flitch, the latter being secured to the stay log substantially coincident with the length thereof.

As shown in Fig. 9 the stay log positions on the flitch are determined by trial and error. Gauge operators usually become so skillful that little or no shifting of base 11 is required. The initial cut begins at X and proceeds toward the heart center C until figure just begins to appear in the veneer. Thereupon, the flitch is shifted on the stay log and cutting again resumed as before. The foregoing, due to the throw of the cheek distance, insures proper cutting of the reduced flitch and permits proper cutting thereof to core size.

Reference now will be had to Fig. 6. In this figure there is illustrated a stay log LL having two arms L', one at each end and each provided with trunnion O, the trunnions being aligned and oppositely directed and receivable and rotatable by the veneer lathe, and a flitch F. The previously described receding end bolts herein are replaced by an adjustable screw construction. The stay log LL may be recessed as at 600 and nest therein a plate 601, the latter being suitably secured by the receding end bolts 602 to the flitch. The plate 601 rotatably supports one end 603a of a screw 603, the opposite free end thereof 604 being squared, or the like, for wrench engagement. Herein the opening 605 through the stay log is threaded and the body portion of the screw 603 is similarly threaded. In this form of the invention the flitch is initially mounted upon the stay log with the plate 601 nested in the aperture 600 and the advanced longitudinal series of screws 600b rigidly hold or secure the flitch to the stay log. Cutting is initiated and continued until figure appears. Then the advanced series of screws 600b are loosened, and the screws 603 are turned to advance the screws 602 relative to the stay log LL, that is, moves the plate 601 and screw 602 farther from the rotational center O of stay log whence the flitch is tilted relative to the stay log flat face confronting the flitch.

This results in tilting or tipping the flitch F in the advanced direction in much the same manner as the addition of the wedges previously described tilts the stay log. The advanced series of screws 600b then are retightened and cutting resumed until figure again just begins to appear. The advanced series of screws 600b are again loosened, the adjusting screws 603 are again advanced to secure further tilting of the flitch on the stay log, and then the advanced series of screws 600b are retightened and cutting resumed. This operation may be repeated as often as desired or required, it being, of course, understood that cutting is always continued until figure just begins to appear.

Reference now will be had to Figs. 7A and 7B. In this form of the invention the stay log is indicated by the numeral 800 and it includes one wide flitch supporting face 801 and the narrower flitch supporting face 802. It also includes spaced openings therethrough as indicated at 803 and 804. The flitch 805 of quarter log character is, first, applied to the narrower face of the stay log and secured by the longer screws 807, the same extending through the openings 804. When figure just appears, the flitch is removed from the stay log and reapplied thereto on the wide face 801, as shown, and secured to that face by the shorter screws 806 in openings 803 and cutting is resumed.

It will be observed that the effect of this shifting of the flitch on the stay log is to move the reduced flitch closer to the center of rotation and this is emphasized because it is important with reference to the form of the invention shown in Figs. 10 and 11. Herein heart center C in Fig. 7B is closer to the axis of rotation O than in Fig. 7A.

Reference now will be had to Figs. 8A to 8D, inclusive. In this form of the invention the stay log 900 is of irregular outline and includes the widest face 901, the second widest face 902, a narrower face 903 and the narrowest face 904. The flitch is successively secured to these faces, as illustrated in the four figures, and cutting is effected in each case until figure appears, whereupon the flitch is removed and transferred to the next widest face and cutting is resumed. The flitch on the widest face is cut until figure appears. Then the core is discarded. In each case the flitch heart center is brought closer to the center of rotation with each flitch position change.

Reference now will be had to Figs. 10 and 11, in which the numeral 50 indicates one rotatable element and 51 an opposed element, the same being carried by the lathe proper and the two being in alignment and power rotatable. Each terminates in a confronting plate arrangement 52 and 53, respectively, and each confronting plate arrangement is provided with a slide, slidably supporting a cross head, the two cross heads being designated by the numerals 54 and 55.

Rigid with each cross head is the flange 56 at the adjacent end of the stay log having the main body portion 57 and the flitch supporting face portion 58, the latter being wider than the portion 57 and being apertured as at 59 to permit the passage of screw 60 for anchoring the flitch to the stay log. A threaded arrangement indicated generally by the numeral 61, is provided between each cross head and its slide support, and associated with the exposed portions thereof is an overhead wrench structure.

Herein said wrench structure includes an elongated frame-like member 70 which is tubular and includes apertured ears 71 for connection to a cable or chain arrangement 72 for support overhead. The tubular portion 70 includes two parallel tubular extensions at right angles to the portion 70 and indicated by the numeral 73. Handles 74 may be provided and extend beyond the portion 70.

Mounted in the tubular portion 70 is a shaft 75 and the opposite ends mount bevel gears 76. The same mesh with bevel gears 77 carried by shafts 78 that extend through the tubular portion 73 and terminate in complementary portions 79 adapted to be detachably associated with the exposed portions 61 of the screw arrangements. One of the shafts 78 is extended as at 80 and a brace structure 81 is adapted to rotate that shaft 78 which in turn rotates the shaft 75 in turn rotating the other shaft 78. These two shafts 78, when the entire wrench arrangement is lowered and held down by the handle 74 in contact with the exposed portions of the members 61, cause rotation of the members 61 to advance or retract the cross heads in the slideways and simultaneously and to the same degree depending upon the direction of rotation of the brace 81. Thus, insofar as the center of rotation of the members 50 and 51 are concerned or the axis of rotation of the stay log structure, the stay log structure proper may be advanced from or retracted toward the center of rotation, as before mentioned.

As shown in Fig. 10, the flitch is secured on the stay log, as illustrated in Fig. 3. The stay log is projected forwardly as far as possible or desirable relative to the knife K so that initial cutting produces comb grain veneer. As cutting proceeds and figure just begins to appear, stay log and flitch rotation is stopped. Then the wrench is associated with the stay log adjusting arrangement and the stay log is retracted from the knife and stay log adjustment is made. Knife readjustment also is effected as required. Then cutting is resumed. This is repeated as often as required until finally only the core remains on the stay log. This is the equivalent of shifting the flitch on the stay log positioning closer to the center of rotation and also it will be apparent it is substantially the equivalent of tilting the flitch on the stay log for like purposes.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A rotatable stay log structure including a pair of arms and a flitch supporting portion therebetween and supported thereby and having a flitch supporting face eccentric of the pivotal axis of the arms, spacing means operatively associated with the supporting portion for tilting a flitch face relative to the eccentric face for tiltable support of a flitch upon the stay log, and screw means for operatively securing the flitch to the stay log.

2. A rotatable stay log structure including a pair of arms and a flitch supporting portion therebetween and supported thereby and having a flitch supporting face eccentric of the pivotal axis of the arms, spacing means operatively associated with the supporting portion for tilting a flitch face relative to the eccentric face for tiltable support of a flitch upon the stay log, and screw means for operatively securing the flitch to the stay log, said spacing means comprising bearing plate means for flitch connection, and other screw means for adjusting the plate means relative to the intermediate portion of the stay log for flitch position adjustment.

3. A stay log structure as defined by claim 1 wherein the screw means are arranged in a substantially longitudinal series parallel to the stay log axis of rotation and which extends completely through the stay log and into the flitch, a second parallel series of screws for flitch connection, the flitch center being closest to the first mentioned series of screws.

4. A stay log structure as defined by claim 2 wherein the first mentioned screw means are arranged in a substantially longitudinal series parallel to the stay log axis of rotation and which extends completely through the stay log and into the flitch and a third and parallel series of screws which extends through the plate means and into the flitch.

5. A stay log structure as defined by claim 2 wherein the first mentioned screw means are arranged in a substantially longitudinal series parallel to the stay log axis of rotation and which extends completely through the stay log and into the flitch and a third and parallel series of screws which extends through the plate means and into the flitch, the first mentioned series being positioned closest to the advancing edge of the stay log and the third series being positioned with the plate means closest to the receding or trailing edge of the stay log.

6. A stay log structure as defined by claim 2 wherein the flitch confronting face of the intermediate portion of the stay log is recessed for plate means nesting, the flitch confronting face of said plate means when nested being substantially coplanar with the stay log flitch confronting face.

7. A stay log structure as defined by claim 2 wherein the flitch confronting face of the intermediate portion of the stay log is recessed for plate means nesting, the flitch confronting face of said plate means when nested being substantially coplanar with the stay log flitch confronting face, and the first mentioned screw means are arranged in a substantially longitudinal series parallel to the stay log axis of rotation and which extends completely through the stay log and into the flitch and a third series of screws which extends through the plate means and into the flitch.

8. A stay log structure as defined by claim 2 wherein the flitch confronting face of the intermediate portion of the stay log is recessed for plate means nesting, the flitch confronting face of said plate means when nested being substantially coplanar with the stay log flitch confronting face, and the first mentioned screw means are arranged in a substantially longitudinal series parallel to the stay log axis of rotation and which extends completely through the stay log and into the flitch and a third series of screws which extends through the plate means and into the flitch, the first mentioned series being positioned closest to the advancing edge of the stay log and the third series being positioned with the plate means closest to the receding or trailing edge of the stay log.

HARRY D. HILL.